3,152,868
PREPARATION OF SCANDIUM HYDRIDES
Charles P. Kempter and Joseph C. McGuire, Los Alamos, N. Mex., assignors to the United States of America as represented by the United States Atomic Energy Commission
No Drawing. Filed Mar. 9, 1961, Ser. No. 94,654
4 Claims. (Cl. 23—204)

The present invention relates to compounds of scandium and more particularly to the scandium hydrides.

Scandium dihydride is a novel compound, having high hydrogen content per unit volume and superior molecular stability, and therefore is an excellent high temperature neutron moderator. Further, the neutron cross sections of scandium are such that the scandium dihydride either pure or in combination with other material(s) is applicable with great usefulness as a neutron shielding material. Other hydrides of scandium are scandium deuteride and scandium tritide both of which can be used as target materials in a particle accelerator or as a simple detector unit for discovering uranium ore bodies.

It is therefore an object of the present invention to provide a hydride which is stable at high temperatures and has a high hydrogen content.

Another object of the present invention is to provide a method of preparation of scandium dihydride, scandium deuteride and scandium tritide.

Further objects and advantages of the present invention will become apparent from a reading of the following specification and claims.

Scandium used in this invention upon spectrographic analysis showed 0.5 percent aluminum and 0.2 percent of yttrium as the major metallic impurities.

The hydrogen used in the reaction is purified by passage over a platinum catalyst, barium oxide, and hot uranium chips. The scandium is outgassed at 800° C. in a silica tube heated by a resistance furnace. The tube is then cooled to room temperature and connected to a series of calibrated volumes containing hydrogen at slightly below atmospheric pressure. Pressures are indicated on a mercury manometer read by a cathetometer to the nearest 0.05 mm. The metal is heated slowly until reaction is indicated by a drop in the manometer reading. At 450° C. a reaction is observed, and the run is held at this temperature for 16 hours. The metal is then slowly cooled to room temperature to promote any additional metal-hydrogen reaction; none was observed. At this point, sufficient hydrogen had reacted to correspond to $ScH_{2.027}$. The compound made is stable at 900° C. under a vapor pressure of 26 cm.

In like manner scandium dideuteride is prepared by substituting deuterium gas for the hydrogen gas described as aforementioned. Also scandium ditritide is prepared by passing tritium gas over the heated scandium metal as outlined in the scandium dihydride process.

Although the invention has been described in detail it is clearly understood that the same is by way of example only and is not to be taken by way of limitation, the spirit and scope of this invention being limited only by the terms of the appended claims.

What is claimed is:

1. The process for the preparation of scandium dihydride comprising the heating of scandium metal in the presence of a hydrogen isotope at a temperature of about 450° C. and at slightly less than atmospheric pressure.

2. The process for the preparation of scandium dihydride comprising the outgassing of scandium metal by heating the scandium to 800° C. in a silica tube, cooling to room temperature and then passing a hydrogen isotope gas over the metal at a temperature of about 450° C. and at slightly less than atmospheric pressure.

3. The process for the preparation of scandium dihydride comprising the outgassing of scandium metal by heating the scandium to about 800° C. in a silica tube, cooling to room temperature and passing a purified hydrogen isotope gas at slightly less than atmospheric pressure over the metal while slowly heating the metal to about 450° C. and holding at this temperature for a time dependent on the mass of metal being reacted and then cooling to room temperature.

4. The process for the preparation of scandium dihydride comprising
 (a) the outgassing of scandium metal by heating the scandium to 800° C in a silica tube,
 (b) cooling to room temperature,
 (c) purifying hydrogen by passage over a platinum catalyst, barium oxide and hot uranium chips,
 (d) passing the purified hydrogen gas at slightly less than atmospheric pressure over the scandium metal
 (e) while slowly heating the metal to 450° C. and holding at this temperature for about 16 hours and
 (f) cooling to room temperature.

References Cited in the file of this patent
UNITED STATES PATENTS

| 1,816,830 | Driggs | Aug. 4, 1931 |
| 1,835,024 | Driggs | Dec. 8, 1931 |
| 2,497,911 | Reilly et al. | Feb. 21, 1950 |
| 2,588,153 | Newton | Mar. 4, 1952 |

OTHER REFERENCES

Vickery, The Chemistry of Yttrium and Scandium, published by Pergamon Press, New York, 1960, page 49.

Kempter et al.: "Journal of Physical Chemistry," volume 61, pages 1237–1238 (September 1957).